United States Patent Office 3,531,987
Patented Oct. 6, 1970

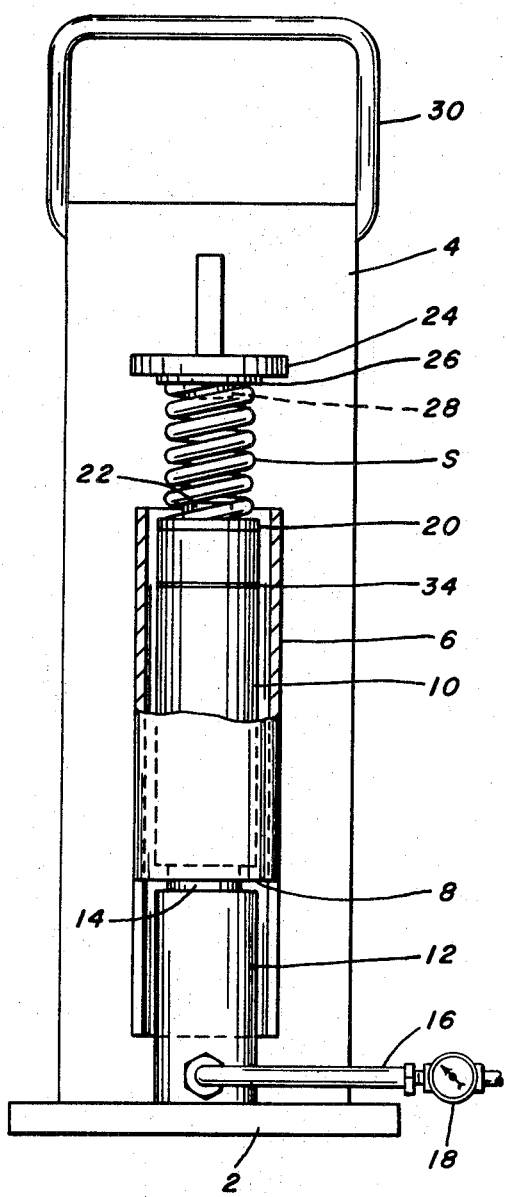
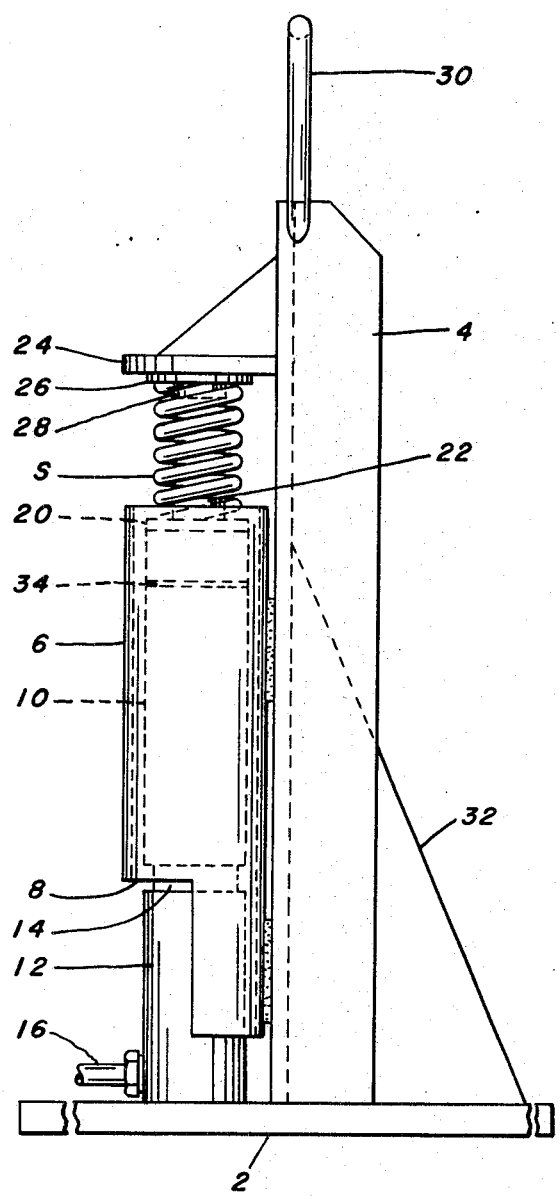

3,531,987
SPRING-TESTING APPARATUS
Clinnon E. Johnson, Gary, Ind., assignor to United States Steel Corporation, a corporation of Delaware
Filed Oct. 24, 1968, Ser. No. 770,267
Int. Cl. G01l 1/04
U.S. Cl. 73—161                                    2 Claims

ABSTRACT OF THE DISCLOSURE

Apparatus includes a sleeve housing having a plunger slidable therein, supported in vertical position above a base. A fluid-pressure jack supported on the base moves the plunger upwardly to compress a spring being tested between the top of the plunger and an abutment spaced above the sleeve. An indicating stripe which extends circumferentially around the plunger adjacent its upper end is adapted to appear above the sleeve when a spring being tested compresses to a length less than a predetermined standard length under a given load.

---

The present invention relates to apparatus for testing helical compression springs and has as its primary object the provision of a unique apparatus for testing helical compression springs which is simple in structure, inexpensive to manufacture and easy to operate.

It is a more specialized object of my invention to provide apparatus for testing springs which includes a base supported upstanding post; a sleeve having a plunger slidable therein mounted on the post in a vertical position above the base; a fluid-pressure jack upstanding on the base and adapted to move the plunger upwardly in the sleeve to compress a spring being tested positioned between the top of the plunger and an abutment above the sleeve; and an indicating stripe extending circumferentially around the plunger adapted to appear above the sleeve when the spring being tested compresses to a length less than a predetermined standard length under a given load.

These and other objects will become more apparent after referring to the following specification and attached drawing, in which:

FIG. 1 is a front elevational view partly in section of the apparatus of the invention shown with a spring in position for testing; and FIG. 2 is a side elevational view of FIG. 1.

Referring more particularly to the drawing, reference character 2 designates a base having a post 4, which may be comprised of a channel section, welded or otherwise fixedly attached thereto and upstanding thereon. A substantially cylindrical sleeve 6 is fixedly mounted, by welding or the like, in substantially vertical disposition on the post 4. The bottom of the sleeve 6 is provided with an undercut portion 8 for a purpose which will become apparent hereinafter.

A plunger 10 of generally cylindrical cross-section is mounted for slidable longitudinal movement within the upper portion of the sleeve 6. A hydraulic jack 12 is disposed in upright position on the base 2 within the undercut bottom portion of the sleeve 6 with its piston 14 projecting above the undercut portion in engagement with the bottom of the plunger 10. Fluid under pressure is supplied to the jack 12 through a line 16 from a source (not shown), which may be a manually operable hydraulic pump. A pressure gauge 18 is provided in the line 16 for indicating the amount of pressure being exerted on the plunger 10 when the jack 12 is actuated during the testing procedure as will be more fully described hereinafter.

The upper end of the plunger 10 is formed into a spring pad 20 having a centering projection 22. An abutment 24 having a spring pad 26 on the underside thereof with a centering projection 28 thereon is fixedly mounted on the post 4 and extends normal thereto above the upper end of sleeve 6.

A handle 30 may be provided on the upper end of the post 4 to facilitate handling the apparatus of the invention so as to render it portable and capable of ultilization in almost any location where spring testing is desired.

A bracing plate 32 extending upwardly and angularly from the base 2 to the rear side of the post 4 may be provided to strengthen support of the post on the base.

An indicating stripe 34, which may be painted on or otherwise applied or formed, extends circumferentially around the plunger 10 spaced a short distance from its upper end. The position of the stripe 34 on the plunger 10 is originally determined by inserting, one at a time, several new springs having acceptable physical qualities between the top of the plunger and the abutment 24 seated between the spring pads 20 and 26 with the centering projections 22 and 28 inserted in the ends of the spring. Then, hydraulic fluid is introduced into the jack 12 to cause its piston 14 to exert a given amount of pressure, e.g., 250 p.s.i., on the bottom of the plunger 10 and thereby cause the upper end of the plunger to rise above the upper end of the sleeve 6 to compress or shorten the spring between the plunger and the abutment. The point on the plunger which coincides with the upper edge of the sleeve when the 250 pound pressure is exerted on the spring is marked on the outer surface of the plunger and the stripe is applied around the plunger at this point.

In operation, to test a spring S, the plunger 10 is raised and held manually in an elevated position in the sleeve 6 to permit the insertion of the hydraulic jack 12 within the undercut portion 8 of the sleeve 6. The jack is then pushed against the rear wall of the sleeve 6 and allowed to rest in vertical position on the base 2 at which time the plunger 10 is allowed to drop to its operating position resting on the top of the jack piston 14.

After the jack 12 and the plunger 10 are in place, the spring S is placed on the upper end of the plunger 10 resting on the spring pad 20 and encircling the centering projection 22. Then the spring S is aligned with the spring pad 26 and the centering projection 28 thereof. Hydraulic fluid is then introduced into the jack 12 until the top of the spring engages the spring pad 26 and encircles the centering projection 28. The centering projections 22 and 28 restrain the spring from lateral displacement during testing. With the spring S now engaged at top and bottom, more hydraulic fluid is introduced to the jack 12 until a predetermined amount of pressure, e.g., 250 p.s.i., is built up within the jack 12. As the pressure is being built up to the predetermined standard value, the plunger 10 is observed as it rises out of the sleeve 6 to determine if the indicator stripe is revealed befoe or after the predetermined standard pressure value has been reached. If the stripe appears visible after the standard pressure value has been achieved, the spring is acceptable. If, however, the indicator stripe becomes visible above the sleeve 6 before the predetermined standard pressure value has been achieved, this will indicate a weak spring and that spring will be rejected.

It will be noted that the apparatus of the invention finds particular utilization in the testing of old springs to determine whether or not their physical characteristics have been so altered in use that they can no longer function as required. Thus, operational spring failures or unnecessary spring replacements can be avoided.

While I have shown but one embodiment of my invention, other adaptations and modifications may be made.

I claim:

1. Spring-testing apparatus comprising a base, a post upstanding on said base, a sleeve secured to said post in a generally vertical position, the bottom of the sleeve being undercut on the side thereof remote from said post to provide for introducing a jack thereinto to stand on said base, an abutment on said post above said sleeve, a spring-compressing member movable vertically in said sleeve to engage a spring positioned between it and said abutment when actuated by said jack, and an indicating stripe disposed circumferentiallyl around said spring-compressing member adjacent its upper end adapted to appear above said sleeve when a spring being tested compresses to a length less than a predetermined standard length under a given load.

2. Apparatus as defined by claim 1 including a spring pad on the underside of aid abutment and on the upper end of said spring-compressing member for receiving opposite ends of a spring to be tested, each of said spring pads including a raised center portion adapted to enter the ends of a spring received between said spring pads to restrain the spring from lateral displacement.

References Cited

UNITED STATES PATENTS

| Re. 21,242 | 10/1939 | Bitzer | 73—161 |
| 1,650,736 | 11/1927 | Zelov | 73—161 XR |
| 2,088,372 | 7/1937 | Gogan | 73—161 |
| 3,404,564 | 10/1968 | Rapp | 73—161 |

LOUIS R. PRINCE, Primary Examiner

F. SHOON, Assistant Examiner